United States Patent
Matsubara et al.

(10) Patent No.: US 8,620,037 B2
(45) Date of Patent: Dec. 31, 2013

(54) HUMAN IMAGE RETRIEVAL SYSTEM

(75) Inventors: Daisuke Matsubara, Kokubunji (JP);
Atsushi Hiroike, Kawagoe (JP);
Yasutsugu Morimoto, Kodaira (JP);
Naoto Akira, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/478,503

(22) Filed: May 23, 2012

(65) Prior Publication Data

US 2012/0294531 A1 Nov. 22, 2012

Related U.S. Application Data

(63) Continuation of application No. 12/260,489, filed on Oct. 29, 2008, now Pat. No. 8,306,281.

(30) Foreign Application Priority Data

Nov. 1, 2007 (JP) ................................. 2007-284664

(51) Int. Cl.
*G06K 9/00* (2006.01)

(52) U.S. Cl.
USPC ............. 382/118; 345/16; 345/427; 382/169; 382/195; 382/305

(58) Field of Classification Search
USPC ............ 345/16, 427; 382/118, 169, 195, 305; 707/3
See application file for complete search history.

(56) References Cited

U.S. PATENT DOCUMENTS

| 6,240,423 B1 * | 5/2001 | Hirata .................................. 1/1 |
| 6,243,492 B1 | 6/2001 | Kamei |
| 6,803,919 B1 * | 10/2004 | Kim et al. ..................... 345/582 |
| 6,996,257 B2 * | 2/2006 | Wang ............................ 382/118 |
| 7,054,468 B2 | 5/2006 | Yang |
| 7,215,791 B2 | 5/2007 | Krishnamachari |
| 2004/0073543 A1 | 4/2004 | Kim et al. |
| 2004/0169658 A1 | 9/2004 | Shin et al. |

(Continued)

FOREIGN PATENT DOCUMENTS

| JP | 2001-167110 | 6/2001 |
| JP | 2003-009069 | 1/2003 |

(Continued)

OTHER PUBLICATIONS

Jeffrey R. Bach et al, The Virage Image Search Engine: An open framework for image management, Feb. 1996, Proceeding of SPIE— The internation Society fo Optical Engineering storage, pp. 76-87.*

(Continued)

*Primary Examiner* — Gregory M Desire
(74) *Attorney, Agent, or Firm* — Antonelli, Terry, Stout & Kraus, LLP.

(57) ABSTRACT

An image retrieval system, including: an image input section for inputting a retrieval target image; an image data base for storing image data; a retrieval section for retrieving a plurality of images similar to said retrieval target image, by using a feature amount of said retrieval target image from said image data base; a filtering processing section for carrying out filtering processing using a whole image feature amount of another feature amount different from said feature amount of said retrieval target image about said plurality of images, to obtain a filtering result; and an outputting section for outputting said filtering result.

4 Claims, 14 Drawing Sheets

(56) References Cited

U.S. PATENT DOCUMENTS

2007/0237426 A1    10/2007  Xie et al.
2008/0166014 A1*   7/2008   Marcus et al. ................ 382/103
2009/0060294 A1    3/2009   Matsubara et al.

FOREIGN PATENT DOCUMENTS

JP    2003-296165    10/2003
JP    2005-352727    12/2005
JP    2007-079736    3/2007

OTHER PUBLICATIONS

Sato et al., "Person Search System using Face and Clothing Features", Matsushita Technical Journal, vol. 52, No. 3, pp. 67-61, Jun. 2006.

Journal of Institute of Image Electronics Engineers of Japan, Sep. 25, 2005, vol. 34, No. 5, pp. 596-605.

* cited by examiner

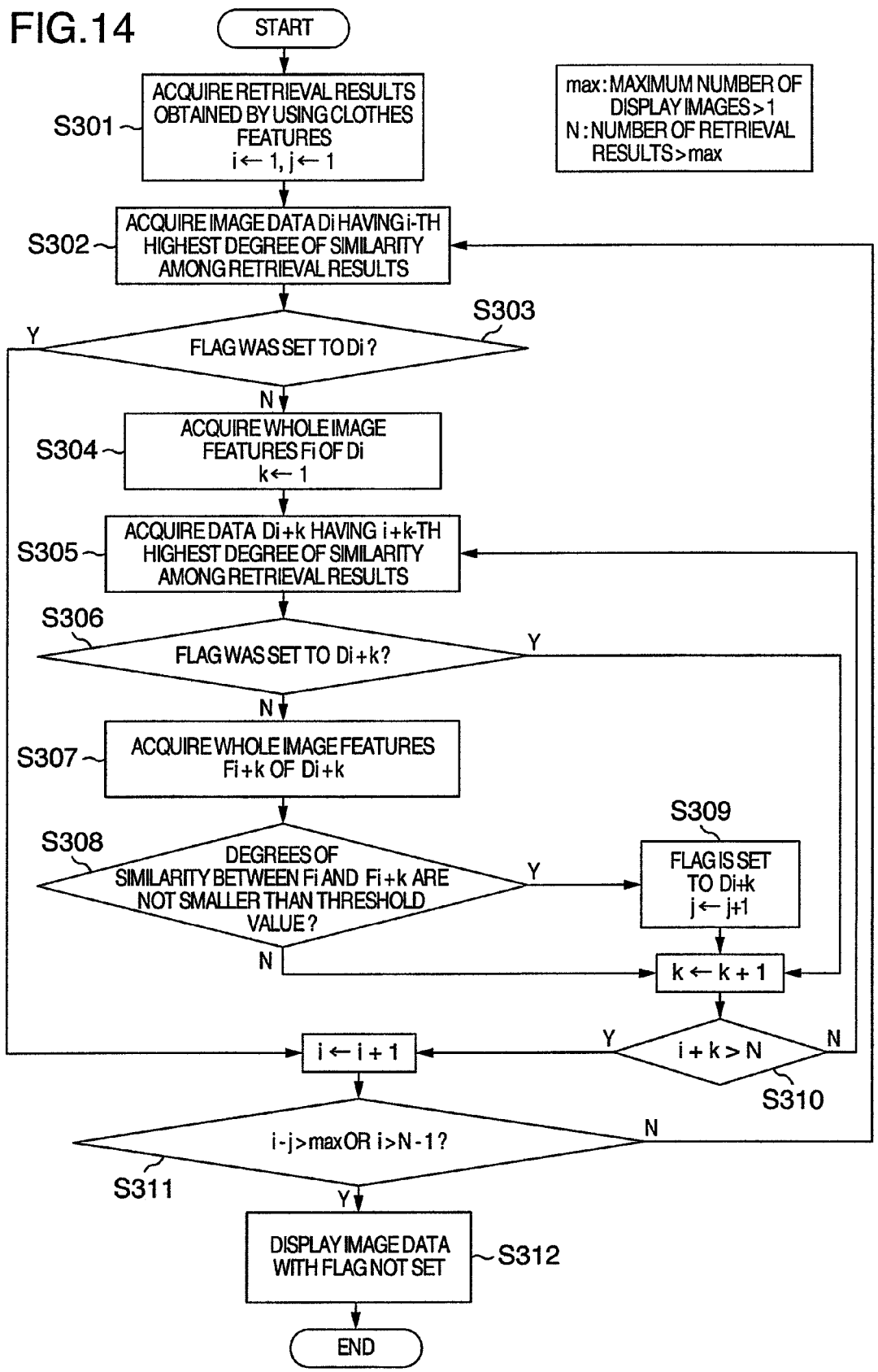

HUMAN IMAGE RETRIEVAL SYSTEM

CROSS REFERENCE TO RELATED APPLICATION

This is a continuation of U.S. application Ser. No. 12/260,489, filed Oct. 29, 2008 now U.S. Pat. No. 8,306,281. This application relates to and claims priority from Japanese Patent Application No. 2007-284664, filed on Nov. 1, 2007. The entirety of the contents and subject matter of all of the above is incorporated herein by reference.

BACKGROUND OF THE INVENTION

The present invention relates to a human image retrieval system and more particularly to information retrieval running on a computer.

In addition to programs broadcast/created by broadcasting stations and video creating companies, various video contents including moving images created/recorded by individuals are presented to users via the Internet in recent years, and viewable contents are increasing day after day. As video recording apparatus have high capacity and become low in price, an amount of recordable contents is increasing correspondingly.

Recent years, various techniques have been proposed for detecting and presenting a scene in which a particular person can be viewed, from a huge amount of video contents. These techniques are applied to a video retrieval system for retrieving a drama or a commercial played by a favorite actor from recorded TV images and to an image monitoring system for searching a particular person from images recorded by using a monitor camera installed in an air port or a station yard.

Data desired by a user using such a system is often presented through an approach to similarity retrieval or grouping.

Similarity retrieval is a technique for searching data similar to a retrieval query designated by a user from video contents and presenting the retrieval results. Similarity based image retrieval in particular is a technique for retrieving data having a high degree of similarity by using image features such as color and shape derived from an image itself. For example, when a person is to be retrieved, a face image, a clothes color and the like can be used as the retrieval query.

JP-A-2005-352727 proposes a face image retrieval system for retrieving image data photographing a desired person by paying attention to particular parts such as eyes and a mouth in a face image, extracting image features of these parts, and evaluating a degree of similarity of each part in each face image held in a retrieval object image group.

Grouping is a technique for forming an image group by collecting similar face images and scenes in video contents and presenting a user with only a representative image in the image group to allow the user to easily select a desired face image or scene.

JP-A-2001-167110 proposes an image retrieval method and system for forming a group of faces of the same person by calculating a degree of similarity between all face images detected from video contents and regarding each face image whose degree of similarity exceeds a threshold value, as the same person, extracting a representative face image of each image character, and displaying each image character in the video contents in a distinguishable manner.

JP-A-2003-009069 proposes a moving image reproducing method and system for presenting a user intending to select a desired scene in video contents with a representative image of each of a plurality of scenes divided from the video contents. In forming a representative image of each scene, a delimiter of the scene is detected to form a still image delimited by detected division points. Thereafter, a degree of similarity between a representative image of one scene and a representative image of the next scene is calculated, and if it is judged that the representative images are similar because the degree of similarity of each image exceeds a predetermined threshold value, these images having a high degree of similarity are grouped to present only representative images having a low degree of similarity as selection candidates.

SUMMARY OF THE INVENTION

Conventional human image retrieval systems aiming to search a desired person from images are associated with the following problems.

If a face image is used as a retrieval query and even if images photographing a desired person are obtained as retrieval results, a number of sets of image data are retrieved having extremely similar backgrounds or whole images such as consecutive frames in images and commercials broadcast repetitively, because of no consideration of information such as background images other than face images contained in images. This poses therefore a problem that the retrieval results are unsatisfactory for listing purpose. Facial expression, direction and the like are almost the same particularly in the same commercials and consecutive frames, resulting in juxtaposed several same commercials in a retrieval system for displaying the retrieval results in the order of a degree of face image similarity. Further, if the same commercials are at upper levels of the retrieval results, the retrieval results of programs photographing the face image are moved to lower levels, posing a severe problem of inefficient retrieval.

The following problems are associated with conventional grouping systems aiming to display persons and scenes easy to be selected by a user, by grouping persons and scenes in images.

Grouping is characterized in using image features themselves to be used for a user to obtain desired data. For example, if a user desires to search a person by paying attention to the face, similar face images are grouped by using image features extracted from the face images. Therefore, only one group is formed for one person.

There arises therefore a problem that even if a plurality of programs or commercials in which a desired person plays are desired to be viewed in a list, human images playing in different programs or commercials are collected in the same group without distinguishing therebetween. The conventional grouping process can not satisfy therefore the requirements for viewing as a list a plurality of programs or commercials in which a desired person plays.

It is therefore an object of the present invention to provide a similarity retrieval result filtering method of classifying the same person playing in different programs or commercials into different groups and removing extremely similar images from the retrieval results. Filtering is a process of properly selecting images to be presented, from the retrieval results, in order to efficiently browse data desired by a user.

First, an image photographing a person as a retrieval target image is input, and a retrieval process is executed by using retrieval image features extracted from the image to thereby obtain image data photographing the desired person as a retrieval result. For example, the retrieval image features may be a face image, a partial face image, a clothes color and the like. The retrieval results obtained by the retrieval process contain data having extremely similar backgrounds and whole images, even if the retrieval results are correct. It is therefore unsatisfactory for listing purpose. To overcome this, the following filtering process is executed.

The filtering process uses filtering image features different from the retrieval image features used by the retrieval process. The filtering process is executed by calculating a degree of similarity of the retrieval results obtained by the retrieval process, and removing from the retrieval results the images having a degree of similarity not lower than a predetermined value and having a lower retrieval results order. The results of the filtering are presented to a user, and it is possible to obtain a plurality of images of various types photographing a desired person.

(1) According to one aspect of the present invention, there is provided a similar face retrieval system for retrieving an image photographing a face similar to a face detected from a retrieval query image from a retrieval target image group by using an image photographing a human face as the retrieval query image, characterized in that whole image features as features representative of background information are extracted from each whole area of an each image of a retrieval target image group, to calculate a degree of similarity through comparison with each set of whole image features, and that an image having a degree of similarity not lower than a certain value and having a lower retrieval result order from retrieval results. In operation, it is possible to acquire an image photographing a similar face as retrieval results and to exclude an image having extremely similar background from the retrieval results.

(2) According to another aspect of the present invention, there is provided a human retrieval system for retrieving an image photographing clothes having a color similar to a color of clothes detected from a retrieval query image from a retrieval target image group by using an image photographing a human as the retrieval query image, characterized in that location information of a camera photographed each image of the retrieval target image is acquired to use the acquired location information as location information features representative of photographed location and calculate a distance of each photographed location through comparison with each set of location information features, and that an image photographed at a distance not longer than a certain value and having a lower retrieval result order from retrieval results. In operation, it is possible to acquire an image photographing a human wearing clothes having a similar color as retrieval results and to exclude an image photographed at a near distance from the retrieval results.

(3) According to another aspect of the present invention, there is provided a similar face retrieval system for retrieving an image photographing a face similar to a face detected from a retrieval query image by using an image photographing a human face as the retrieval query image, characterized in that location information of a camera photographed each image of the retrieval target image is acquired to use the acquired location information as location information features representative of photographed location and calculate a distance of each photographed location through comparison with each set of location information features, and that an image photographed at a distance not longer than a certain value and having a lower retrieval result order from retrieval results. In operation, it is possible to acquire an image photographing a similar face from the retrieval results and to exclude an image photographed at a near distance from the retrieval results.

(4) According to another aspect of the present invention, it is disclosed that a threshold value as a criterion of excluding target data from the retrieval results can be changed. By increasing the number of data to be excluded, it is possible to display retrieval results having a lower order of a degree of similarity (i.e., a low degree of similarity).

The present invention has various advantages such as an ability to efficiently search the same person playing in different scenes.

Other objects, features and advantages of the invention will become apparent from the following description of the embodiments of the invention taken in conjunction with the accompanying drawings.

BRIEF DESCRIPTION OF THE DRAWINGS

FIG. 14 is a flow chart illustrating a filtering process of the third embodiment.

DESCRIPTION OF THE EMBODIMENTS

First Embodiment

Description will now be made on a similarity retrieval result filtering method according to the first embodiment of the present invention, in connection with the accompanying drawings.

Figure 1:
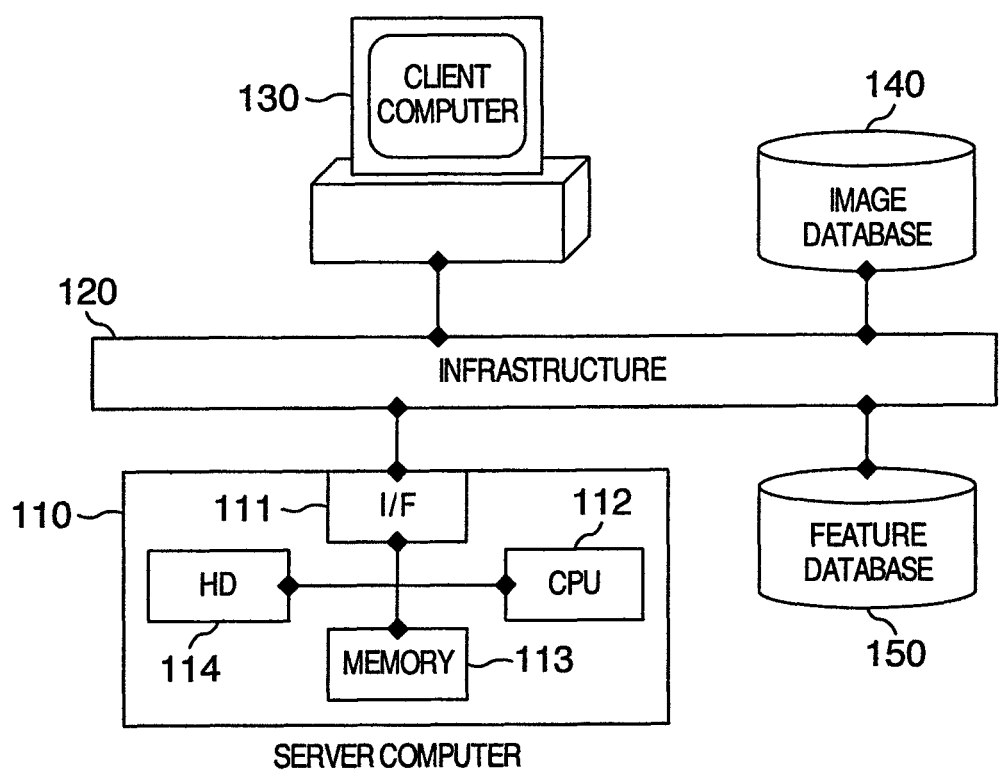
FIG. 1 is a diagram showing the configuration of a system according to a first embodiment.

FIG. 1 shows an example of the configuration of a system realizing the present invention.

As shown in FIG. 1, the configuration for realizing the filtering method of the embodiment is constituted of a server computer 110, an external interface 111, a central processing unit 112, a memory 113, a large capacity external storage 114, an infrastructure 120, a client computer 130, an image database 140 and a feature database 150.

The server computer 110 on which a retrieval engine runs provides the client computer 130 with services such as a retrieval process and a filtering process via the infrastructure 120. In the server computer 110, the external interface 111 provides an interface (I/F) to an external and connects the server computer 110 and infrastructure 120. The central processing unit (CPU) 112 controls the whole operation of the server computer. The memory 113 is used as a working area when CPU 112 executes a control process, and has temporary storage areas for various data and a program area in which programs are loaded. The large capacity storage unit 114 such as a hard disc (HD) stores digital data such as a program to be executed by CPU 112.

The client computer 130 is equipped with a display unit such as a CRT for displaying output screens from the server computer 110. Data input to the server computer 110 is made from an input terminal such as a keyboard equipped in the client computer 130. It is to be noted that although services are provided through communications between the server computer 110 and client computer 130 via a network in this embodiment, services may be provided in the form of applications which are executed by a general personal computer.

The image database 140 stores image data, and the feature database 150 stores retrieval features and filtering features extracted from target data. These databases may be stored in different hard disks or may be stored in the hard disk 114 equipped in the server computer 110.

Next, description will be made on an image data registration process according to the embodiment.

Figure 2:
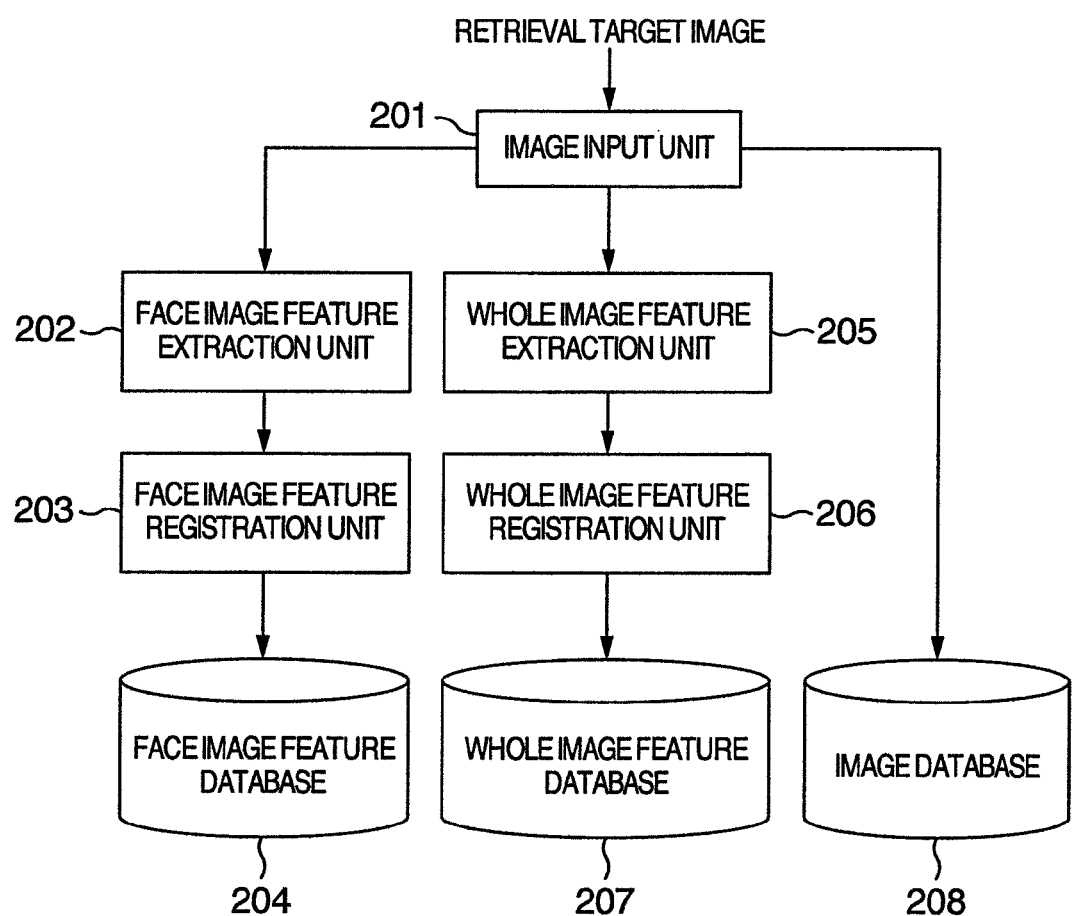
FIG. 2 is a block diagram illustrating a data registration process of the first embodiment.

FIG. 2 shows an example of a block diagram illustrating a process flow when a retrieval target image is registered in the database according to the embodiment.

As shown in FIG. 2, the human image retrieval system using the similarity retrieval result filtering method of the embodiment is constituted of an image input unit 201, a face image feature extraction unit 202, a face image feature registration unit 203, a face image feature database 204, a whole image feature extraction unit 205, a whole image feature registration unit 206, a whole image feature database 207 and an image database 208.

The image input unit 201 executes an input process for a retrieval target image. The retrieval target image is any arbitrary image data not considering whether a person exists or not.

The face feature extraction unit 202 detects a face area from input image data, and extracts face image features from the face area. In this embodiment, so-called edge pattern features are used as the face image features. In order to extract edge pattern features, a plurality of characteristic edge patterns are set beforehand. A face image is subjected to composition division into a lattice shape, and the number of edge patterns contained in each lattice area is counted. A histogram is formed based upon the numbers of edge patterns, and converted into multi-dimension vectors to generate face image features. Face image features may be formed by paying attention to parts such as eyes, a nose and a mouth specific to each face.

The face image feature registration unit 203 registers extracted face image features into the face image feature database 204. For an image from which a face image was not detected, no data is registered into the face image feature database 204, and the succeeding processes will not be executed.

The whole image feature extraction unit 205 extracts whole image features basing upon color information from a whole area of a retrieval target image. In this embodiment, a whole area of a retrieval target image is subjected to composition division into a lattice shape. Multi-dimension vectors formed from a color histogram of each divided area are used as whole image features. Instead of color information, information on a luminance value, a lightness value or a combination thereof may be used if the information represents features of a whole image or features may not be extracted from the whole image area.

The whole image feature registration unit 206 registers extracted whole image features into the whole image feature database 207.

The retrieval target image after completion of feature extraction is registered in the image database 208. In this case, not the retrieval target image itself, but a thumbnail image formed from the retrieval target image or link information to the retrieval target image may be stored.

Data after completion of the above-described image data registration processes is used as target images of the retrieval process to be described later. It is to be noted that the image data registration processes may not be executed before retrieval execution by a user, but features may be extracted from image data when retrieval execution is performed. In this case, it is needless to say that although the feature databases are not necessary, an execution speed is lowered.

Next, the retrieval process of the embodiment will be described.

Figure 3:
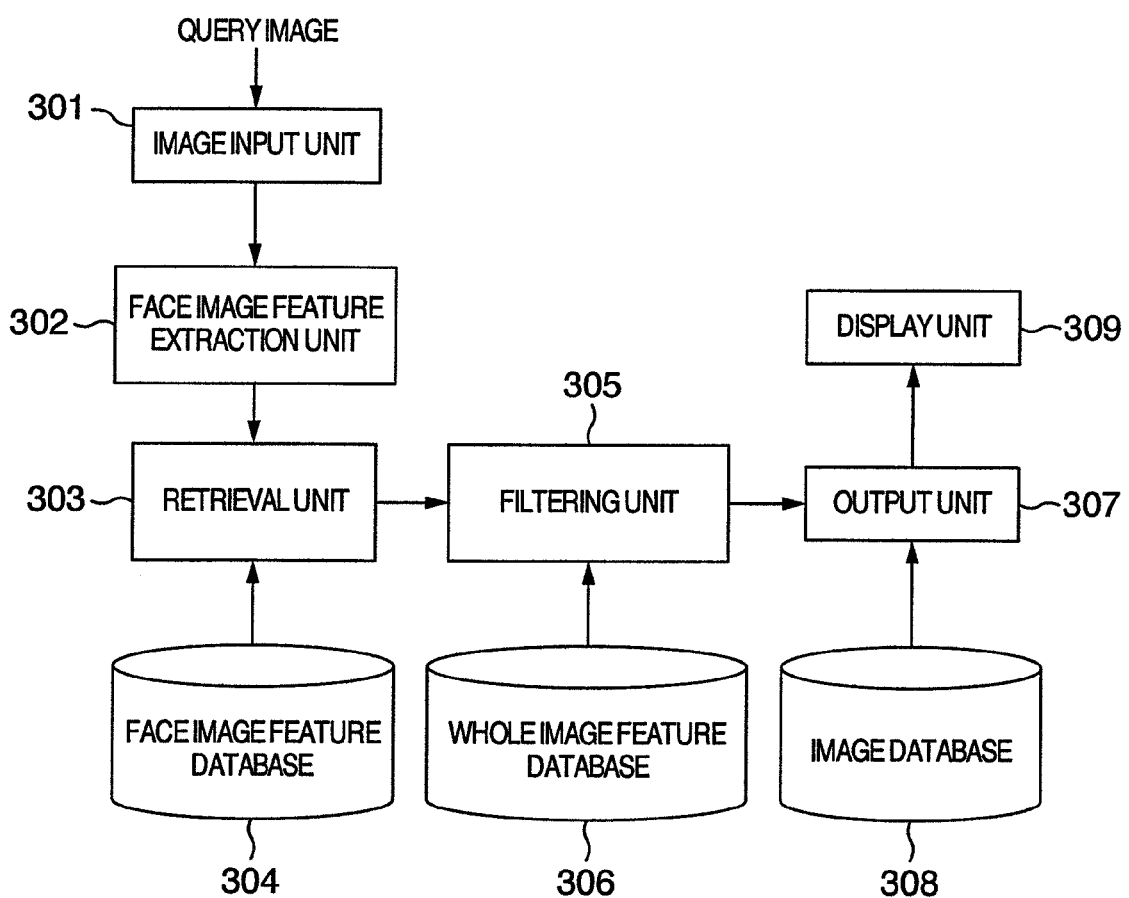
FIG. 3 is a block diagram illustrating a retrieval process of the first embodiment.

FIG. 3 shows an example of a block diagram illustrating a flow of the retrieval process and filtering process according to the embodiment.

As shown in FIG. 3, the human image retrieval system using the similarity retrieval result filtering method of the embodiment is constituted of an image input unit 301, a face image feature extraction unit 302, a retrieval unit 303, a face image feature database 304, a filtering unit 305, a whole image feature database 306, an output unit 307, an image database 308, and a display unit 309. The image input unit 301, face image feature extraction unit 302, face image feature database 304, whole image feature database 306, and image database 308 are the same as the image input unit 201, face image feature extraction unit 202, face image feature database 204, whole image feature database 206, and image database 208 shown in FIG. 2, respectively.

The image input unit 301 executes an input process for a retrieval query image. In this case, the retrieval query image is an image in which a person is photographed.

The face image feature extraction unit 302 executes a process similar to that of the face image feature extraction unit 202 shown in FIG. 2, detects a face area from the input image data, and extracts face image features from the face area. If a face area is not detected, it is assumed that the retrieval process is not executed.

The retrieval unit 303 calculates a degree of similarity between the face image features extracted from the retrieval query image and features of a retrieval target image group registered in the face image feature database. In this embodiment, an inverse of a Euclidean distance between feature vectors is used as a degree of similarity. Other values representative of a distance between feature vectors such as a Manhattan distance and a Mahalanobis distance may also be used. As retrieval results, N retrieval target images are acquired from the retrieval target image group in the order of a higher degree of similarity between face image features. The number N of acquired retrieval results is set sufficiently larger than the number of retrieval results capable of being displayed on the display unit 309 at a time, for the filtering process to be described later. For example, if the number of retrieval results capable of being displayed is "20", then it is preferable to set the number N of acquired retrieval results to about "500" to "1000".

The filtering unit 305 executes the filtering process by using the whole image features registered in the whole image feature database 306. A degree of similarity of whole image features between retrieval results is calculated, and images having a degree of similarity not lower than a predetermined value and having a lower retrieval results order are excluded from the retrieval results. In this embodiment, similar to the face image retrieval, an inverse of a Euclidean distance between feature vectors is used as a degree of similarity. The details of the filtering process will be described later.

The output unit 307 acquires image data corresponding to the filtering process results from the image database 308, rearranges the image data in the order of a higher degree of similarity calculated by the retrieval process, and displays the rearranged image data on the display unit 309. A display monitor or the like of the client computer 130 shown in FIG. 1 is used as the display unit 309. Images to be displayed are not only the face area used for the retrieval process but also the image data itself in which the face area is photographed. The reason for this is, for example, that data desired when a user performs human retrieval is not the face image itself, but often the image data in which the face image is photographed.

Next, description will be made on the details of the filtering process according to the embodiment.

Figure 4:
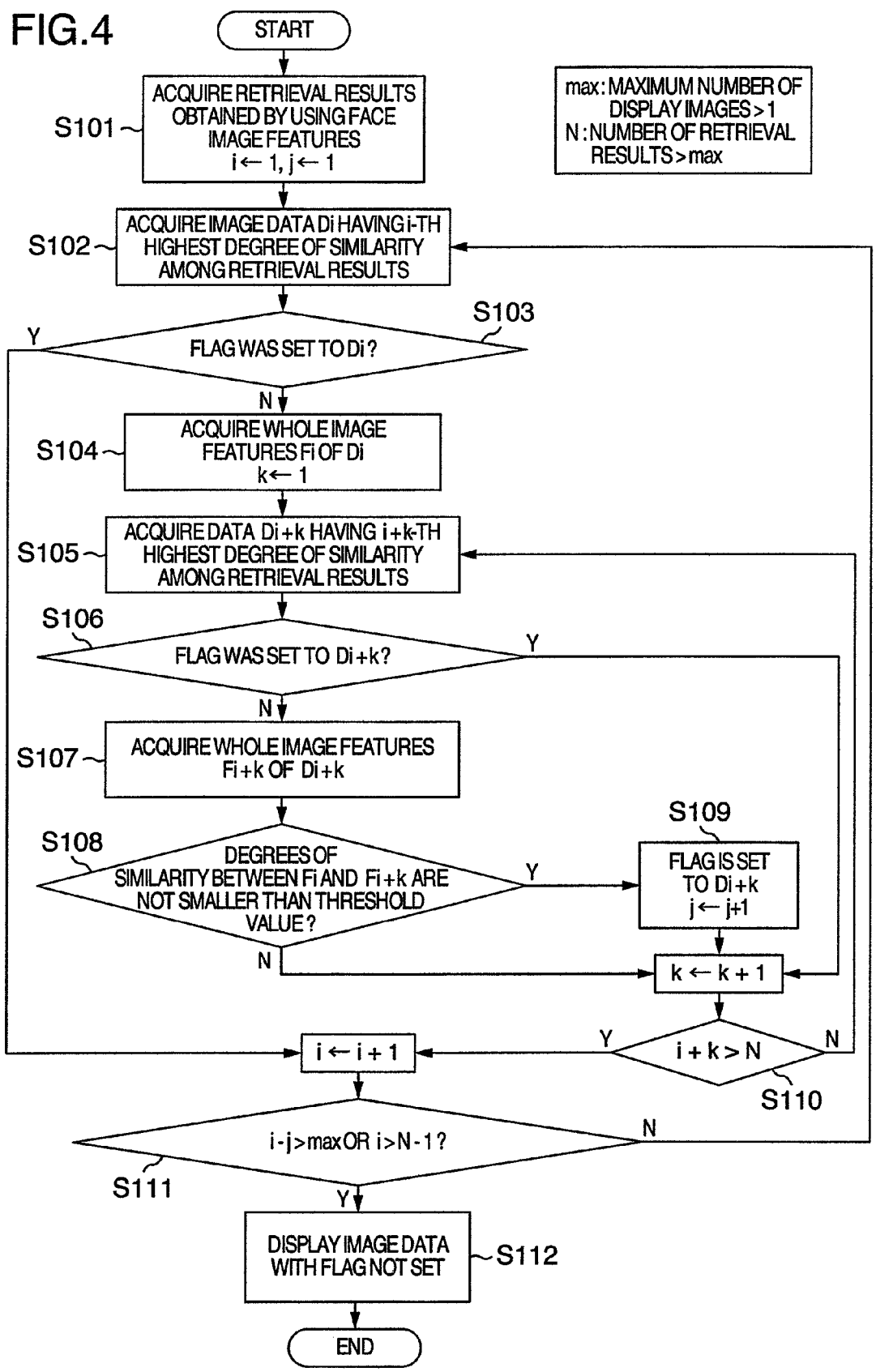
FIG. 4 is a flow chart illustrating a filtering process of the first embodiment.

FIG. 4 shows an example of a flow of the filtering process of the embodiment. In this filtering process, if it is judged from the results of the filtering process that image data judged, from the criterion to be described later, as not being displayed on the display unit 309 shown in FIG. 3 is set with a flag to distinguish it from image data to be displayed. As a unit for distinguishing image data to be displayed, a table may be formed to manage image data, or image data not to be displayed may be excluded from the retrieval results and only the image data to be displayed is held.

First, the retrieval unit 303 shown in FIG. 3 acquires the retrieval results obtained by using the face image features.

Image data having the highest order of the retrieval results is acquired (S102) to check whether a flag was set or not (S103). If the flag was set, the image data is skipped to thereafter acquire image data of the next highest order. In the following, the acquired image data is called a subject image. The whole image features for the filtering process extracted from the subject image are acquired from the whole image feature database 306 shown in FIG. 3 (S104).

Data (hereinafter called a comparative image) having an order of the retrieval results lower than that of the subject image is acquired (S105) to check whether a flag was set (S106). If the flag was set, this image data is skipped, and image data having the next order is acquired to use it as the comparative image. The whole image features for the filtering process extracted from the comparative image are acquired from the whole image feature database 306 (S107).

A degree of similarity between whole areas of the subject and comparative images is obtained by using the whole image features of the images to check whether the degree of similarity is not lower than a threshold value (S108). If the degree of similarity between whole images is not smaller than the threshold value, a flag is set to the comparative image data (S109). The threshold value may be determined beforehand or it may be designated by a user. It is judged at S110 whether the processes at S105 to S109 have been executed for all data having the order of the retrieval results lower than that of the subject image.

The above-described processes are executed by changing the subject image sequentially from data having a higher order of the retrieval results to a lower order. If the number of sets of subject image data reaches the maximum number of display images of the display unit 309 shown in FIG. 3 or if the scanned subject image reaches the end of the retrieval results, then the process is terminated (S111). Images with set flags rearranged in the order of a degree of similarity obtained by the face image retrieval process results become the results of the filtering process. The filtering results are displayed on the display unit 309 shown in FIG. 3 (S112).

The filtering process for the retrieval results may not be executed by all means, but the face image retrieval results may first be displayed on the display unit 309 shown in FIG. 3, and thereafter the filtering process is executed only when a user issues a filtering process request. In this case, the face image retrieval results are temporarily stored in order to use the results for the filtering process. Although a storage location may be the memory 113 or hard disk shown in FIG. 1, it is generally preferable to use the memory 113 shown in FIG. 1 when considering an execution speed.

Next, description will be made on a display method for the retrieval results and filtering process results according to the embodiment.

Figure 5:
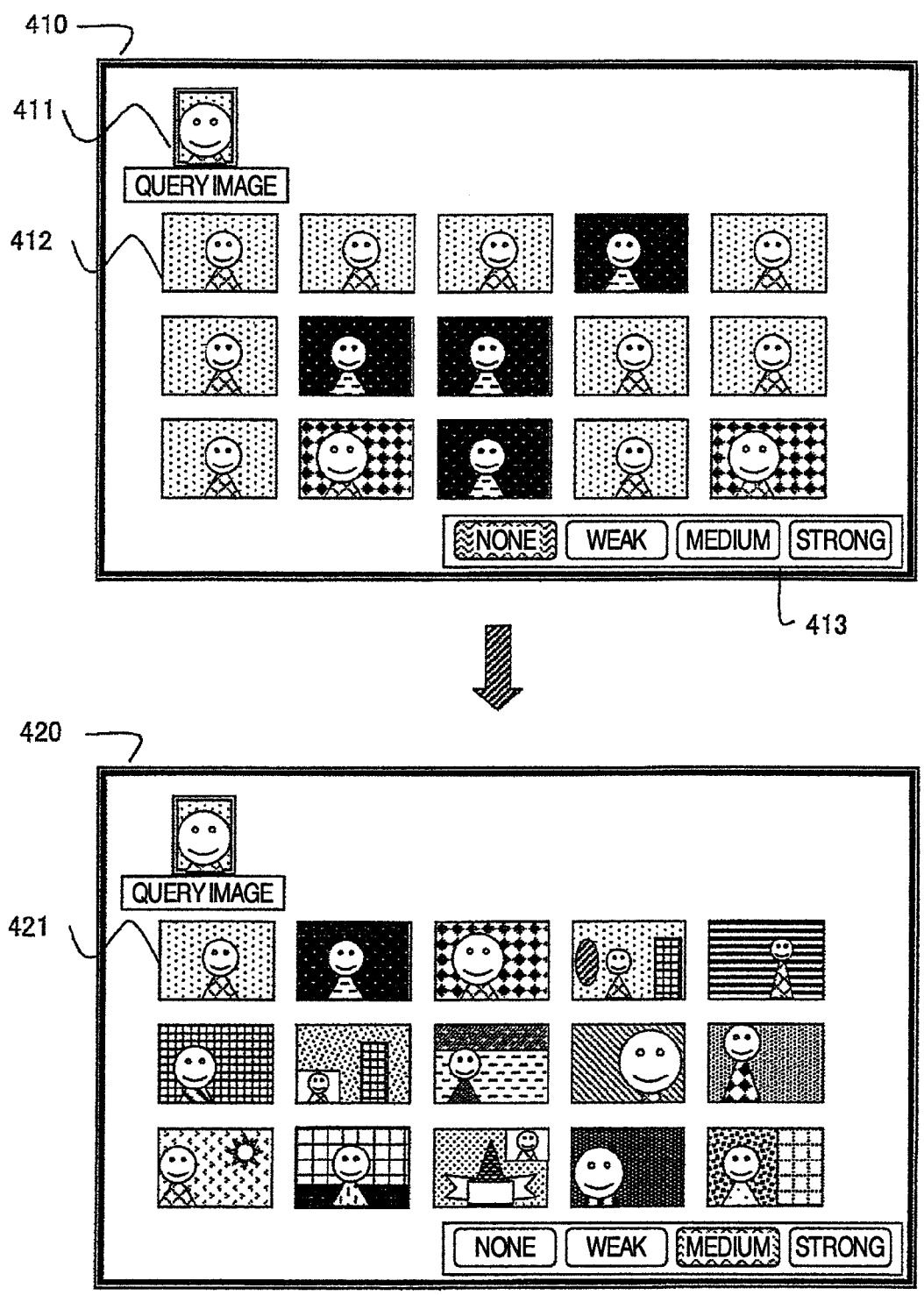
FIG. 5 is a schematic diagram showing screen transition in the filtering process of the first embodiment.

FIG. 5 shows an example of transition of a retrieval result screen by the filtering process. Description will be made on an example in which the results of the face image retrieval are once displayed on the display unit 309 shown in FIG. 3 and thereafter a user issues a filtering process request. In this example, the layout of a screen displays fifteen images on one screen.

Fifteen images among the retrieval results retrieved by using a query image 411 as a retrieval target image are rearranged in the order of a higher degree of similarity and displayed in a result display area 412 of an initial screen 410 for retrieval result display. Reference numeral 413 represents buttons for designating a strength of the filtering process. A button with wavy line meshing is a button presently selected. A strength of the filtering process is determined by designating the threshold value to be used by the degree-of-similarity threshold value judgment step S108 shown in FIG. 4. If the threshold value is small, the number of sets of data exceeding the threshold value increases when a degree of similarity between whole images is calculated, so that the filtering process is executed strongly. If a strength of the filtering process is not designated but a constant state is maintained always, it is sufficient that the button 413 indicates only a presence/absence of execution of the filtering process. As any one of "week", "medium" and "strong" buttons 413 is depressed, the filtering process is executed and the retrieval result display transits to a filtering result screen 420. Filtering process results 421 indicate the results of the filtering process corresponding to the strength designated by the buttons 413.

Figure 6:
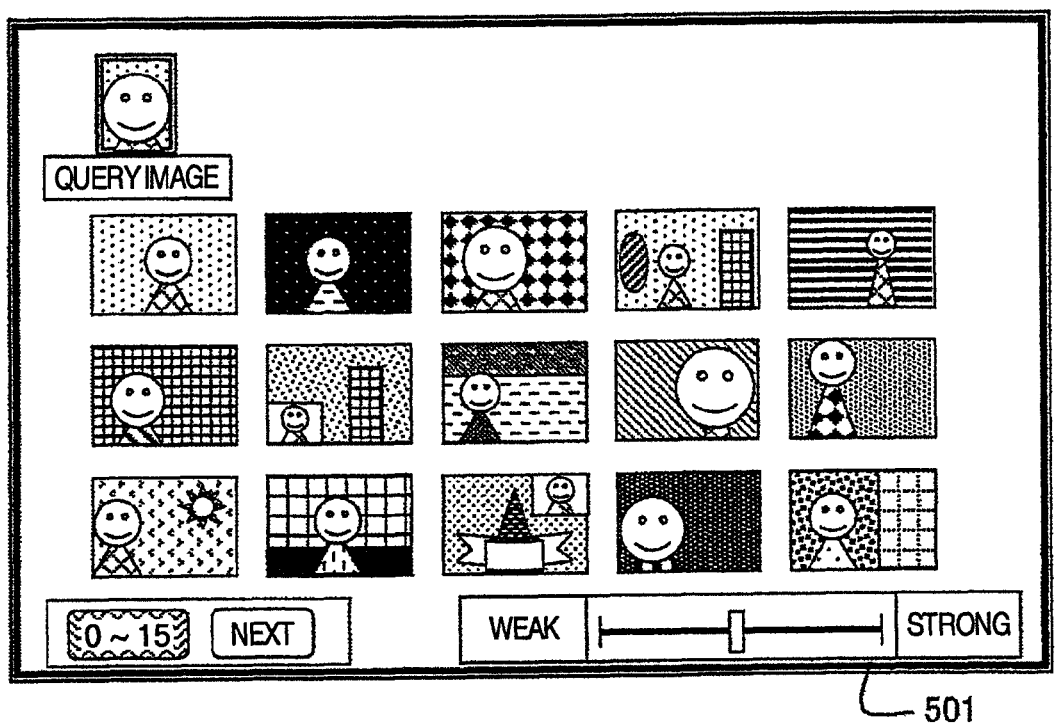
FIG. 6 is a schematic diagram showing a mechanism for requesting the filtering process of the first embodiment.

FIG. 6 shows an example of a user interface for designating a strength of the filtering process. As shown, in order to designate a strength of the filtering process, a filtering process strength designation bar 501 may be used without using the buttons 413 shown in FIG. 5. By moving the bar 501 right and left, the threshold value can be designated as a continuous value.

As described above, according to the first embodiment, the results of the face image retrieval are displayed on the output unit 309 shown in FIG. 3, by excluding the retrieval results having the extremely similar whole images. It is therefore possible to efficiently retrieve a desired person playing in different scenes. Further, by changing a strength of the filtering process, the retrieval results having a lower order can be displayed on the retrieval result display screen.

Second Embodiment

Description will be made on the second embodiment performing the similarity retrieval result filtering method of the present invention, with reference to the other accompanying drawings. In the above-described first embodiment, image contents such as TV programs and movies are used as target images. In the second embodiment, image contents photographed with a monitor camera and the like are used as target images. Colors of clothes of persons photographed in images are used as retrieval features, and camera installation locations are used as filtering features.

Figure 7:
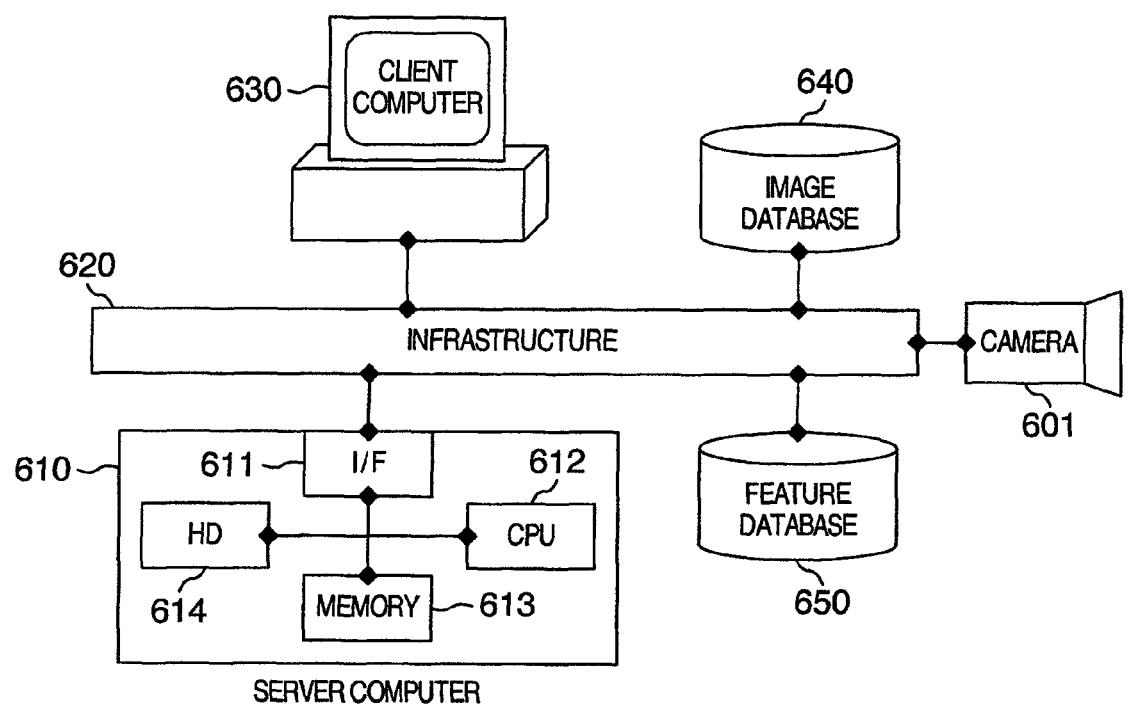
FIG. 7 is a diagram showing the configuration of a system according to a second embodiment.

FIG. 7 shows an example of the configuration of a system realizing the present invention.

As shown in FIG. 7, the configuration for realizing the filtering method of the embodiment is constituted of a camera 601, a server computer 610, an external interface 611, a central processing unit 612, a memory 613, a large capacity external storage 614, an infrastructure 620, a client computer 630, an image database 640 and a feature database 650.

In this embodiment, an image photographed with the camera 601 is stored in the image database. In this case, location information on a position where the camera is installed is also acquired. An image to be registered in the image database may be a still image extracted from a moving image photographed with the camera or still images photographed every several seconds.

Description will be made on a process to be executed at the time of image data registration, according to the embodiment.

Figure 8:
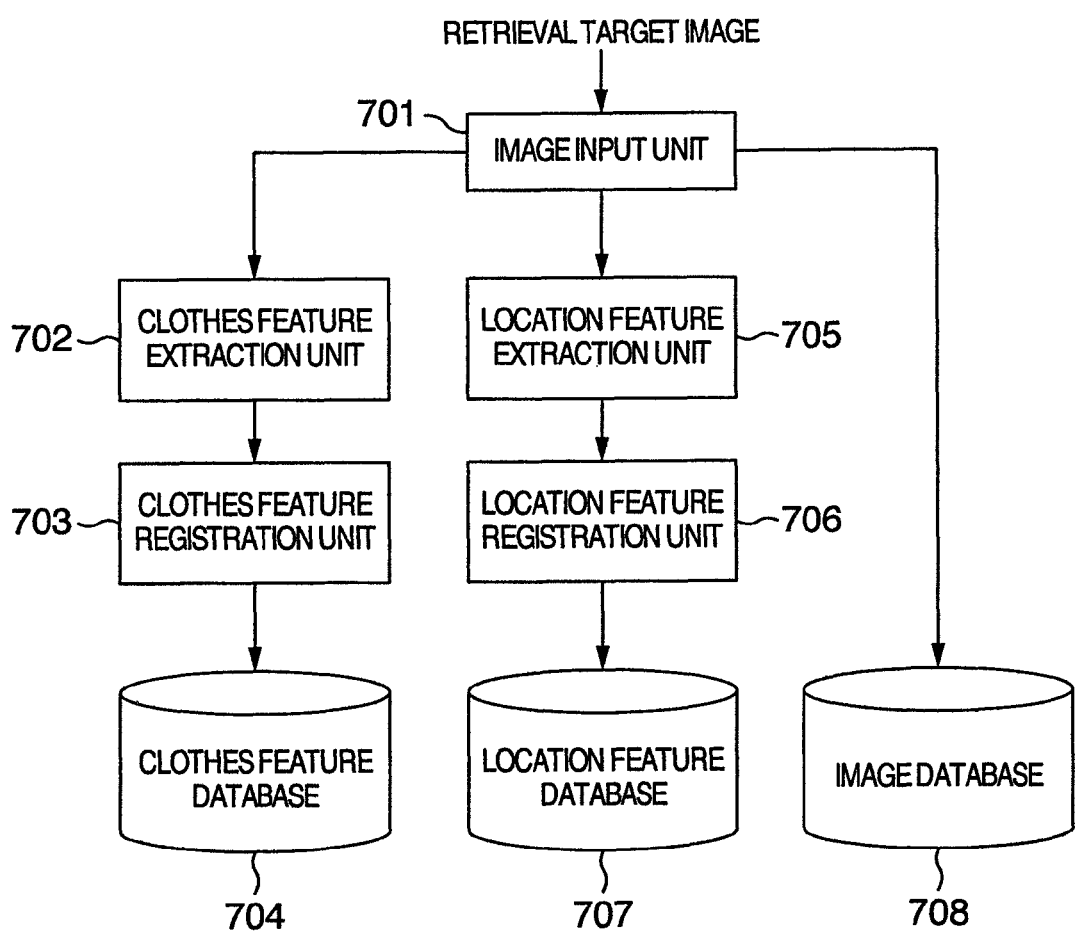
FIG. 8 is a block diagram illustrating a data registration process of the second embodiment.

FIG. 8 shows an example of a block diagram illustrating a process flow when retrieval target images are registered in the database according to the embodiment.

As shown in FIG. 8, the human image retrieval system using the similarity retrieval result filtering method of the embodiment is constituted of an image input unit 701, a clothes feature extraction unit 702, a clothes feature registration unit 703, a clothes feature database 704, a location feature extraction unit 705, a location feature registration unit 706, a location feature database 707 and an image database 708.

The image input unit 701 executes an input process for a retrieval target image. The retrieval target image is any arbitrary image data not considering whether a person exists or not. In addition to the retrieval target image, location information on the camera photographed the image is also input.

The clothes feature extraction unit 702 extracts clothes features for the retrieval process from an input image. In the above-described first embodiment, the face image features detected from the image data are used for the retrieval process. In this embodiment, color of clothes of a person in an image photographed with the monitor camera is used as features for the retrieval. Therefore, a person whose clothes have a similar color is retrieved. A human area is detected from an input image, and a color histogram is extracted from the human area and is used as the clothes features. As the features for the retrieval process, either a face image, a skin color or the like may be used. The features for the retrieval are required to be properly set in accordance with an installation object of a monitor system. If a human area is not detected from a retrieval target image, the succeeding processes are not executed.

The clothes feature registration unit 703 registers the clothes features extracted by the clothes feature extraction unit 702 into the clothes feature database 704.

The location feature extraction unit 705 extracts location features for the filtering process. In the above-described first embodiment, the whole image features extracted from the whole area of image data are used for the filtering process. In this embodiment, photographing location information of an image photographed with the camera is used as the features for the filtering process. Used as location features are the coordinate values of a location of the photographing camera represented by a three-dimensional space coordinate system setting a proper origin and coordinate axes. As the photographing location information, location information of GPS may be used, a room number of a building may be used if the positional relation between rooms is known, or other information may be used.

After completion of features extraction, the retrieval target image is stored in the image database 708.

Next, description will be made on the retrieval process and filtering process of the embodiment.

Figure 9:
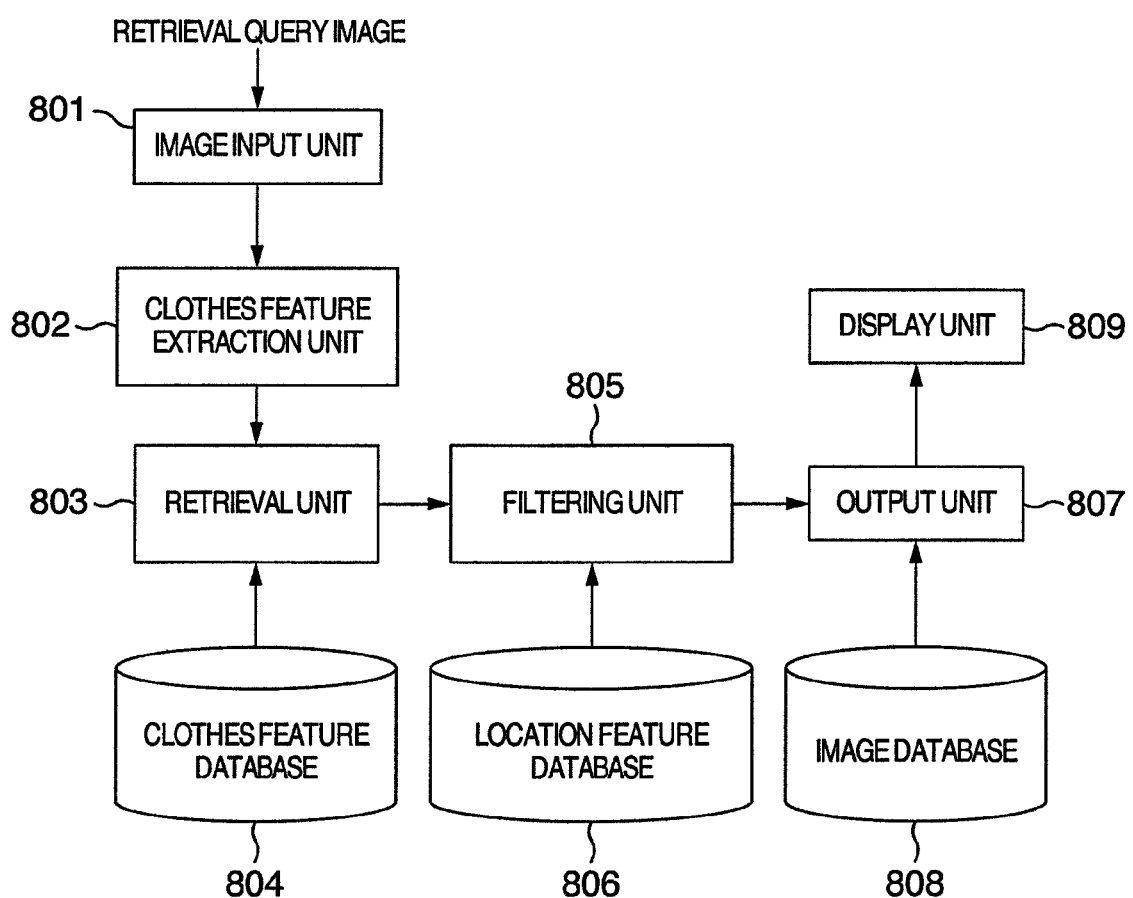
FIG. 9 is a block diagram illustrating a retrieval process of the second embodiment.

FIG. 9 shows an example of a block diagram illustrating a flow of the retrieval process and filtering process according to the embodiment. As shown in FIG. 9, the human image retrieval system using the similarity retrieval result filtering method of the embodiment is constituted of an image input unit 801, a clothes feature extraction unit 802, a retrieval unit 803, a clothes feature database 804, a filtering unit 805, a location feature database 806, an output unit 807, an image database 808, and a display unit 809. The image input unit 801, clothes feature extraction unit 802, clothes feature database 804, location feature database 806, and image database 808 are the same as the image input unit 701, clothes feature extraction unit 702, clothes feature database 704, location feature database 707, and image database 708 shown in FIG. 8, respectively.

The image input unit 801 executes an input process for a retrieval query image. In this case, the retrieval query image is an image in which a person is photographed. As a method of supplying human image data, image data such as a photograph may be supplied or image data selected from images photographed with the camera 601 may be supplied.

The clothes feature extraction unit 802 executes a process similar to that of the clothes feature extraction unit 702 shown in FIG. 8, detects a human area from the input image data, and extracts clothes features from the human area. If a human area is not detected, it is assumed that the retrieval process is not executed.

The retrieval unit 803 calculates a degree of similarity between the clothes features extracted from the retrieval query image and features of a retrieval target image group registered in the clothes feature database. In this embodiment, an inverse of a Euclidean distance between feature vectors is used as a degree of similarity. Other values representative of a distance between feature vectors such as a Manhattan distance and a Mahalanobis distance may also be used. As retrieval results, N retrieval target images are acquired from the retrieval target image group in the order of a higher degree of similarity between clothes features. Similar to the first embodiment, the number N of acquired retrieval results is set sufficiently larger than the number of retrieval results capable of being displayed on the display unit 809 at a time, for the filtering process to be described later. For example, if the number of retrieval results capable of being displayed is "20", then it is preferable to set the number N of acquired retrieval results to about "500" to "1000".

The filtering unit 805 executes the filtering process by using the location features registered in the location feature database 806. A degree of similarity of clothes features between retrieval results is calculated, and images having a degree of similarity not lower than a predetermined value and having a lower retrieval results order are excluded from the retrieval results. In this embodiment, the location features are used by representing location information on the photographing camera by a three-dimensional coordinated system, and an inverse of a distance between vectors is used as a degree of similarity. The details of the filtering process will be described later.

The output unit 807 acquires image data corresponding to the filtering process results from the image database 808, rearranges the image data in the order of a higher degree of similarity calculated by the retrieval process, and displays the rearranged image data on the display unit 809. A display monitor or the like of the client computer 630 shown in FIG. 1 is used as the display unit 809. Similar to the first embodiment, images to be displayed are not only the human area used for the retrieval process but also the image data itself in which the human area is photographed.

Next, description will be made on the details of the filtering process of this system.

Figure 10:
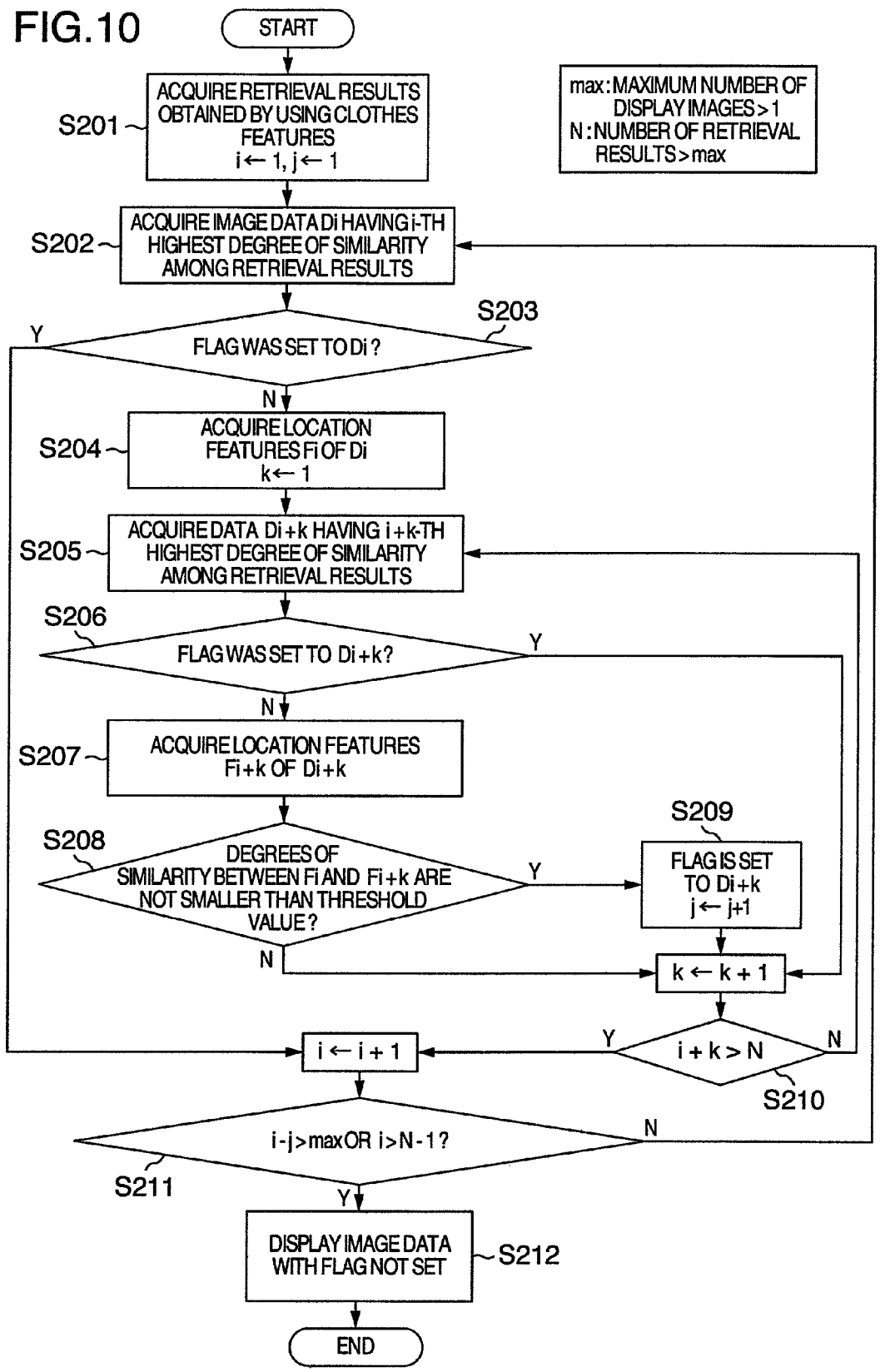
FIG. 10 is a flow chart illustrating a filtering process of the second embodiment.

FIG. 10 shows an example of a flow of the filtering process. The processes (S202, S203, S204, S205, S206, S207, S209, S210, S211 and S212) other than acquisition of closes features of image data at S201, acquisition of location features at S204 and comparison/judgment of a degree of similarity between location features at S208 are similar to corresponding processes shown in FIG. 4 of the first embodiment.

When a degree of similarity between location information features is calculated and if the location information features are represented by space coordinate values, an inverse of a distance between vectors of location information features can be used as a degree of similarity. This distance between vectors may be a Euclidean distance, a Manhattan distance or the like. In this case, since the nearer the camera photographing positions are, the higher a degree of similarity between location information features becomes. Therefore, if a person wearing similar clothes stops at the same position, this image is excluded by the filtering process, and only a representative image is displayed on the display unit 809 shown in FIG. 9 as the retrieval results. If the location information features are represented by a room number of a building, whether the room numbers are the same or not may be used as a degree of similarity. In this case, if the room numbers are the same, a degree of similarity is set to "1", whereas if the room numbers are different, a degree of similarity is set to "0". In this manner, the scenes that persons wearing the same clothes are in different rooms can be displayed as the filtering results. Further, a degree of similarity may be defined by using a positional relation between rooms or a distance between room doors.

As described above, according to the second embodiment, since the retrieval results at near photographing locations are excluded from being displayed on the display unit 809 shown in FIG. 9, the same person photographed at different locations can be retrieved efficiently.

Third Embodiment

Description will be made on the third embodiment performing the similarity retrieval result filtering method of the present invention, with reference to the other accompanying drawings. In the third embodiment, colors of clothes of persons photographed in images are used as features for the retrieval, and a color histogram extracted from a whole image is used as features for the filtering.

Figure 11:
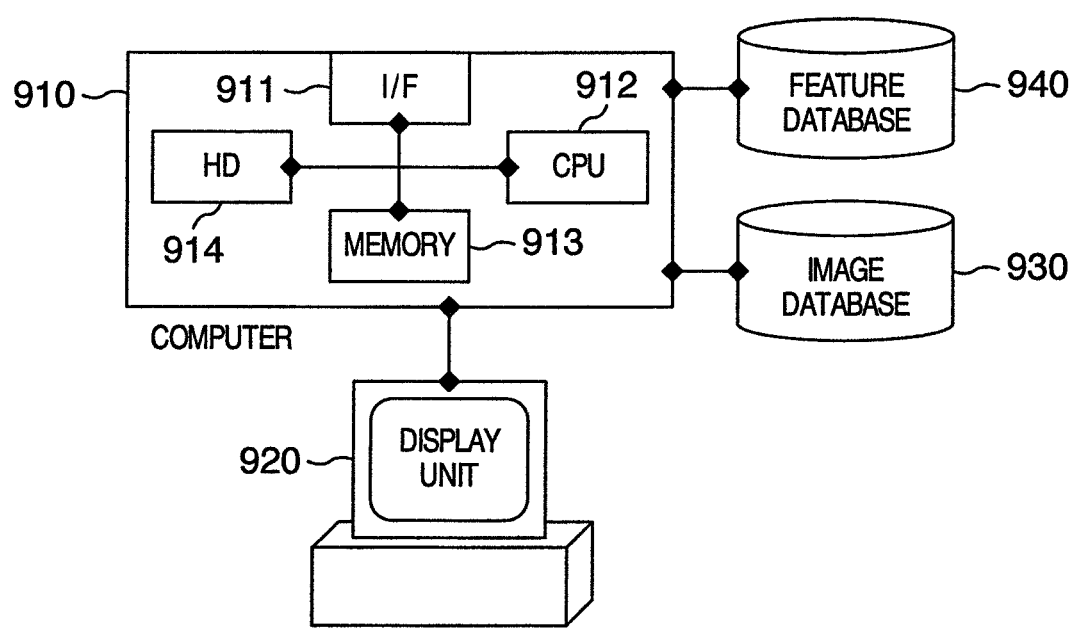
FIG. 11 is a diagram showing the configuration of a system according to a third embodiment.

FIG. 11 shows an example of the configuration of a system realizing the present invention.

As shown in FIG. 11, the configuration realizing the filtering method of the embodiment is constituted of a computer 910, an external interface 911, a central processing unit 912, a memory 913, a large capacity external storage unit 914, a display unit 920, an image database 930 and a feature database 940.

The computer 910 on which a retrieval engine runs provides services such as a retrieval process and a filtering process. In the computer 910, the external interface 911 is used for connection to an external apparatus. The central processing unit (CPU) 912 controls the whole operation of the server computer. The memory 913 is used as a working area when CPU 912 executes a control process, and has temporary storage areas for various data and a program area in which programs are loaded. The large capacity storage unit 914 such as a hard disc (HD) stores digital data such as a program to be executed by CPU 912.

The display unit 920 such as a CRT displays output screens for calculation results by the computer 910. Data input to the server computer 910 is made from an input terminal such as a keyboard connected to the interface 911. The image database 930 stores image data or link information to the image data, and the feature database 940 stores retrieval features and filtering features extracted from target data. In this embodiment, it is assumed that the image database 930 and feature database 940 are equipped in the computer. This embodiment is not a client/server system described in the first and second embodiments, but operates as applications to be executed by a general personal computer.

Next, description will be made on an image data registration process according to the embodiment.

Figure 12:
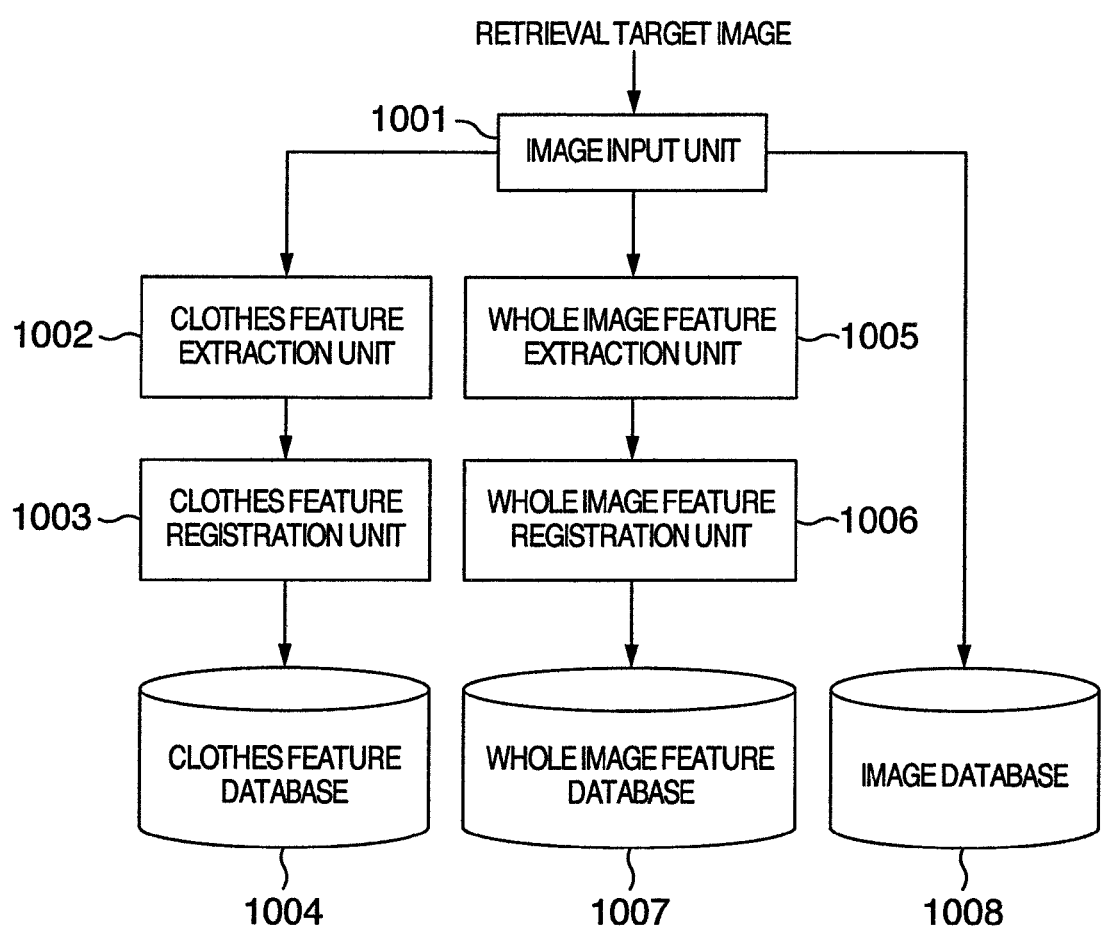
FIG. 12 is a block diagram illustrating a data registration process of the third embodiment.

FIG. 12 shows an example of a block diagram illustrating a process flow when a retrieval target image is registered in the database according to the embodiment.

As shown in FIG. 12, the human image retrieval system using the similarity retrieval result filtering method of the embodiment is constituted of an image input unit 1001, a clothes feature extraction unit 1002, a clothes feature registration unit 1003, a clothes feature database 1004, a whole image feature extraction unit 1005, a whole image feature registration unit 1006, a whole image feature database 1007 and an image database 1008.

The image input unit 1001 executes an input process for a retrieval target image. The retrieval target image is any arbitrary image data not considering whether a person exists or not.

The clothes feature extraction unit 1002 extracts clothes features to be used for the retrieval process from an input image. Similar to the second embodiment, color of clothes of a person photographed in a retrieval target image is used as features for the retrieval.

The clothes feature registration unit 1003 registers the clothes features extracted by the clothes feature extraction unit 1002 into the clothes feature database 1004.

Similar to the first embodiment, the whole image feature extraction unit 1005 extracts whole image features based on color information, from a whole area of the retrieval target image.

The whole image feature registration unit 1006 registers the extracted whole image features into the whole image feature database 1007.

After completion of feature extraction, the retrieval target image is stored in the image database 1008.

Next, description will be made on the retrieval process and filtering process according to the embodiment.

Figure 13:
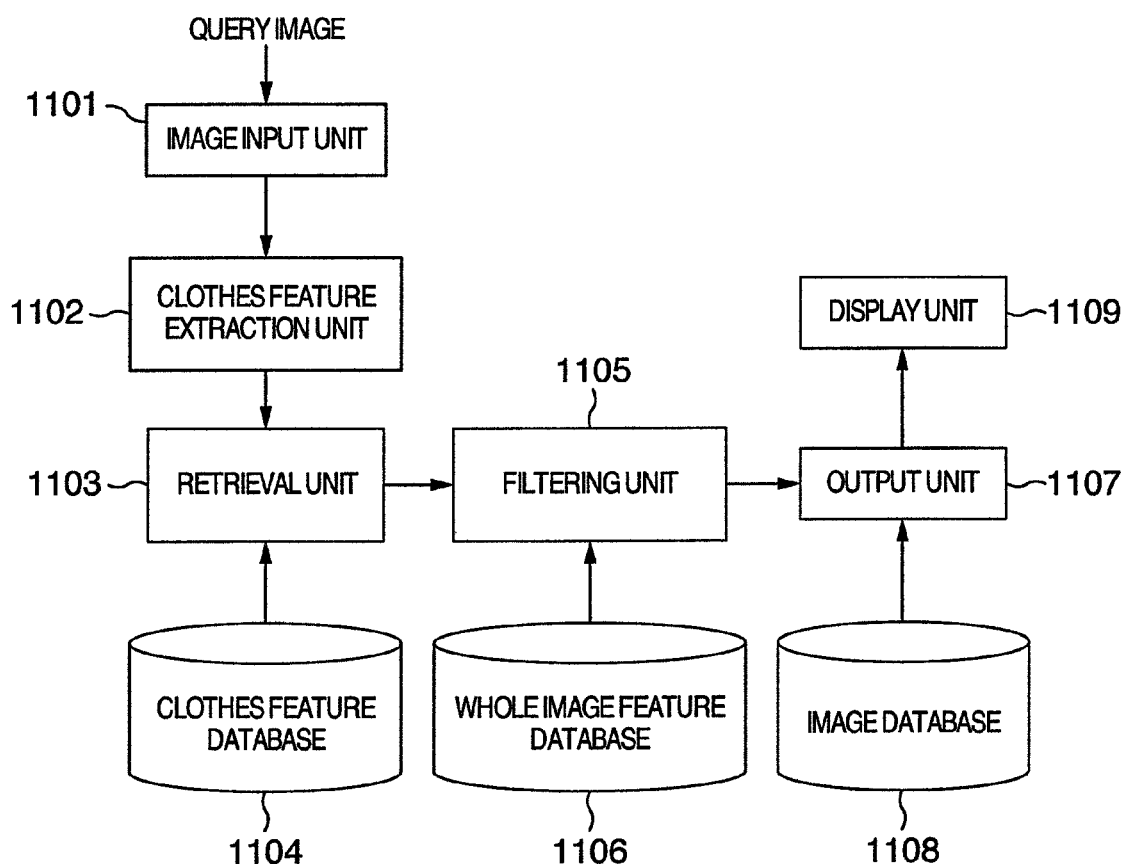
FIG. 13 is a block diagram illustrating a retrieval process of the third embodiment.

FIG. 13 shows an example of a block diagram illustrating a flow of the retrieval process and filtering process according to the embodiment. As shown in FIG. 13, the human image retrieval system using the similarity retrieval result filtering method of the embodiment is constituted of an image input unit 1101, a clothes feature extraction unit 1102, a retrieval unit 1103, a closes feature database 1104, a filtering unit 1105, a whole image feature database 1106, an output unit 1107, an image database 1108, and a display unit 1109. The image input unit 1101, clothes feature extraction unit 1102, clothes feature database 1104, whole image feature database 1106, and image database 1108 are the same as the image input unit 1001, clothes feature extraction unit 1002, clothes feature database 1004, whole image feature database 1007, and image database 1008 shown in FIG. 12, respectively.

The image input unit 1101 executes an input process for a retrieval target image. In this case, the retrieval target image is an image in which a person is photographed.

The clothes feature extraction unit 1102 performs a process similar to that of the clothes feature extraction unit 1002 shown in FIG. 12, detects a human area from the input image data, and extracts clothes features from the human area. If a human area is not detected, it is assumed that the retrieval process is not executed.

Similar to the second embodiment, the retrieval unit 1103 calculates a degree of similarity between the clothes features extracted from the retrieval target image and features of a retrieval target image group registered in the clothes feature database, and acquires retrieval results sufficiently larger than the number of retrieval results capable of being displayed on the display unit 1109 at a time.

Similar to the first embodiment, the filtering unit 1105 executes the filtering process by using the whole image features registered in the whole image feature database 1106. A degree of similarity of clothes features between retrieval results is calculated, and images having a degree of similarity not lower than a predetermined value and having a lower retrieval results order are excluded from the retrieval results.

The output unit 1107 acquires image data corresponding to the filtering process results from the image database 1108, rearranges the image data in the order of a higher degree of similarity calculated by the retrieval process, and displays the rearranged image data on the display unit 1109. A display unit or the like of the client computer 920 shown in FIG. 11 is used as the display unit 1109. Similar to the other embodiments, images to be displayed are not only the human area used for the retrieval process but also the image data itself in which the human area is photographed.

Next, description will be made on the details of the filtering process of this system.

FIG. 14 shows an example of a flow of the filtering process. The processes (S302, S303, S304, S305, S306, S307, S309, S310, S311 and S312) other than acquisition of closes features of image data at S301 are similar to corresponding processes shown in FIG. 4 of the first embodiment. Similar to the second embodiment, the retrieval results obtained by using the clothes features are acquired at S301.

As described above, according to the third embodiment, since the retrieval results of images having similar backgrounds are excluded from being displayed on the display unit 1109 shown in FIG. 13, the same person photographed at different situations can be retrieved efficiently.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image retrieval system, comprising:
   an image input section for inputting a retrieval target image;
   an image data base for storing image data;
   a retrieval section for retrieving a plurality of images similar to said retrieval target image, by using a target feature of said retrieval target image from said image data base;
   a filtering processing section for carrying out filtering processing using a whole image feature different from said target feature of said retrieval target image about said plurality of images, to obtain a filtering result; and
   an outputting section for outputting said filtering result, wherein both the whole image feature and the target feature are extracted from the retrieval target image.

2. The image retrieval apparatus according to claim 1;
   wherein said target feature of said retrieval target image is a face amount of a face image.

3. The image retrieval apparatus according to claim 2;
   wherein the whole image feature and the target feature are extracted from different areas of the retrieval target image.

4. The image retrieval system according to claim 1,
   wherein the whole image feature and the target feature are extracted from different areas of the retrieval target image.

* * * * *